June 17, 1930.   R. W. SLEE   1,764,756
AUTOMOBILE CREEPER
Filed June 8, 1928
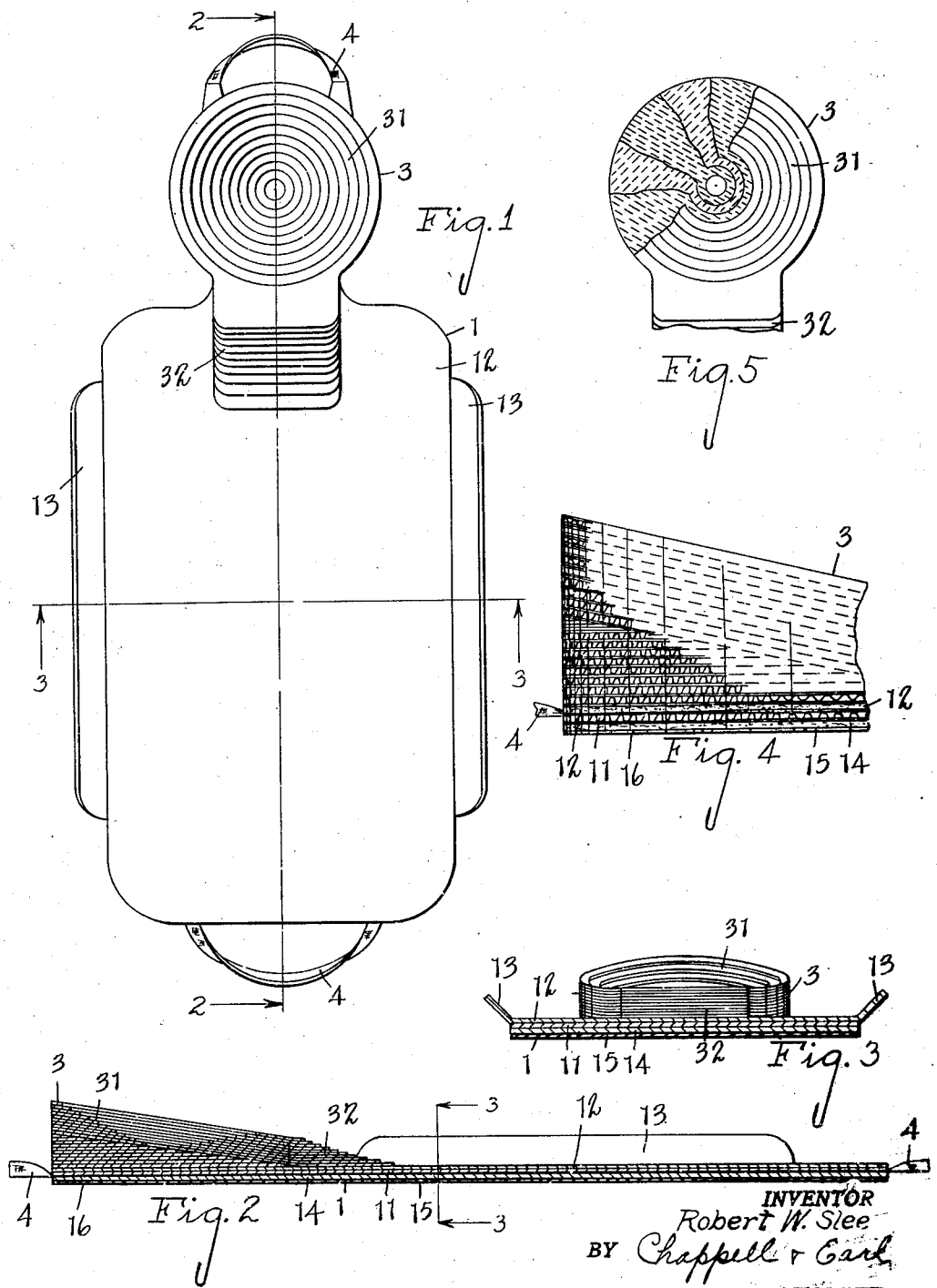

Patented June 17, 1930

1,764,756

UNITED STATES PATENT OFFICE

ROBERT W. SLEE, OF THREE RIVERS, MICHIGAN

AUTOMOBILE CREEPER

Application filed June 8, 1928. Serial No. 283,793.

The main objects of this invention are:

First, to provide an auto "creeper" that is of a simple, light, durable, and inexpensive construction and yet durable enough to withstand the constant hard usage.

Second, to provide an auto "creeper" that is a nonconductor of heat and cold, moisture proof, and readily drained of water or oil, and therefore affording protection to the user and securing healthful working conditions.

Third, to provide a "creeper" that gives substantially full working space under a vehicle.

Fourth, to provide such a structure of creeper with an improved head rest and extension adapted as a means for propelling the said creeper in use.

Objects pertaining to details and economies of my invention will definitely appear from the description to follow.

I accomplish the objects of my invention by the devices and means described in the following specification. The invention is clearly defined and pointed out in the claims.

A device embodying my invention is clearly illustrated in the accompanying drawing forming a part of this specification, in which:

Fig. 1 is a top plan view of my improved creeper.

Fig. 2 is a longitudinal section on line 2—2 of Fig. 1.

Fig. 3 is a cross section on line 3—3 of Fig. 1.

Fig. 4 is an enlarged view of the head rest, the dotted lines denoting the continuity of the laminations.

Fig. 5 is a detail plan view of the head rest with successive laminations broken away to show the criss-cross relation of the corrugations of the successive layers.

The parts will be identified by their numerals of reference which are the same in all the views.

1 is the base or body member of my improved creeper which is made up of one or more layers 11 of corrugated fiber board with the corrugations longitudinally disposed. 12 is an upper deck or layer of cardboard, the edges of which are turned up at 13 to afford protection for the user. 14 is the sole which may be made up of a layer of heavy cardboard with a thin protecting layer 15, of tough fiber preferably, although leather, canvas, or even metal might be used. These layers are preferably held together by paste, glue or cement of any suitable character. They might be stitched or riveted but this would add to the expense and serve to crush or break down the material and is not so desirable.

16 is the head rest base extension. The head rest is made up of the head rest angle base 3 composed of criss-crossed layers of corrugated board to give a light bulky structure. This is made up of a series of layers of different lengths on which is disposed and arranged the concave head support 31 which is made up of layers of corrugated board criss-crossed, with disks cut out of the center forming ring like plates with a depression for the head of the user. The corrugations are left open at the periphery and at the center and afford a head rest that is very well ventilated and very light. Wedge-shaped extensions 32 are made up of successive layers of shorter length similar to the base angle and the top plates are extended over the joint between the head rest and wedge shaped extension, as seen in Fig. 2, making the structure complete. This head rest and extension are of great importance in this structure as they afford the means for contact with the body of the user that enables him to advance the auto diver under an automobile or truck where it is desired for use, it being of great consequence in enabling the user to retain the auto diver in place while sliding along the floor or ground as the case may be.

Hanger straps 4 of any suitable material are inserted between the layers of the base and serve as handles to handle the device and also as hangers to support the same in vertical position for ready drainage.

My improved auto creeper is economical to manufacture and one that can be sold at a very low price, the simplicity of the construction being a great factor in producing an auto creeper of this type.

This structure, built largely of cellular board, is very light. The corrugations of the board, being disposed lengthwise, prove very efficient in the matter of draining water or oil out of the structure when it is hung up by the straps. The thick parts, being made of criss-crossed corrugated board, are very staunch and resistant and at the same time possess a considerable degree of elasticity. The corrugations, being left open both at the inner and outer part of the head rest, afford highly satisfactory ventilation.

The structure is light in use, the guards at the side afford protection for the user, and, at the same time, as the structure rests flat on the floor or ground, space is made fully available for the activities of the user.

I desire to claim my invention broadly and also specifically as pointed out in the appended claims.

Having thus described my invention, what I claim as new and desire to secure by Letters Patent, is:

1. An automobile creeper comprising a body portion containing a layer of corrugated board with the corrugations disposed longitudinally, a stiffened wear sole beneath the same, a fiber upper deck therefor with extended upwardly projecting side guards, suspension handle straps at each end secured between the layers, a head rest comprising a wedge-shaped laminated base of criss-cross corrugated board, a head support of laminated criss-cross corrugated boards with depression at the center formed by cut out center parts of each layer, the corrugations being open both within and without the said depression, a laminated inclined support in front of the said head rest and connected thereto by the extension top layers of the laminated head support disposed over the joint, all coacting as specified.

2. An automobile creepsr comprising a body portion containing a layer of corrugated board with the corrugations disposed longitudinally, a stiffened wear sole beneath the same, a fiber upper deck therefor with extended upwardly projecting side guards, suspension handle straps at each end secured between the layers, and a head rest carried by said body portion.

3. An automobile creeper comprising a body portion containing a layer of corrugated board with the corrugations disposed longitudinally, a stiffened wear sole beneath the same, a fiber upper deck therefor with extended upwardly projecting side guards, a head rest carried by said body portion, all coacting as specified.

4. An automobile creeper comprising a flat body portion, a head rest carried by the body portion comprising a wedge-shaped laminated base of criss-cross corrugated board, a head support of laminated criss-cross corrugated boards with depression at the center formed by cut out center parts of each layer, the corrugations being open both within and without the said depression, a laminated inclined support in front of the said head rest and connected thereto by the extension top layers of the laminated head support disposed over the joint, all coacting as specified.

5. An automobile creeper comprising a flat body portion, a head rest carried by the body portion comprising a wedge-shaped laminated base of criss-cross corrugated board, a head support of laminated criss-cross corrugated boards with depression at the center formed by cut out center parts of each layer, the corrugations being open both within and without the said depression, all coacting as specified.

6. An automobile creeper comprising a flat body portion, a head rest carried by the body portion, a head support of laminated criss-cross corrugated boards with depression at the center formed by cut out center parts of each layer, the corrugations being open both within and without the said depression, a laminated inclined support in front of the said head rest and connected thereto by the extension top layers of the laminated head support disposed over the joint, all coacting as specified.

7. An automobile creeper comprising a flat body portion, a head rest carried by the body portion, a head support of laminated criss-cross corrugated boards with depression at the center formed by cut out center parts of each layer, the corrugations being open both within and without the said depression, all coacting as specified.

8. An automobile creeper comprising a broad flat body portion adapted to slide when in use, and a head rest with rigid base extension for engagement by the body of the user to advance the same, as specified.

In witness whereof I have hereunto set my hand.

ROBERT W. SLEE.